10/84

United States Patent

[11] 3,620,819

[72] Inventor Michele Croce
740 Northeast 26th Ave., Pompano Beach, Fla. 33062

[21] Appl. No. 14,640
[22] Filed Feb. 26, 1970
[45] Patented Nov. 16, 1971
Original application Feb. 19, 1968, Ser. No. 706,697, now abandoned. Divided and this application Feb. 26, 1970, Ser. No. 014,640

[54] METHOD OF PRODUCING A DIRT-RESISTANT TILE

5 Claims, No Drawings

[52] U.S. Cl. .......... 117/123 A, 117/169 R
[51] Int. Cl. .......... C04b 21/00
[50] Field of Search .......... 117/123 A, 62.1

[56] References Cited
UNITED STATES PATENTS

| | | | |
|---|---|---|---|
| 2,583,985 | 1/1952 | Avery | 117/123 X |
| 3,102,039 | 8/1963 | Manecke | 117/123 X |

*Primary Examiner*—Alfred L. Leavitt
*Assistant Examiner*—Wayne F. Cyron
*Attorney*—Harry N. Schofer

ABSTRACT: A method of producing a dirt-resistant cement tile and the like, preferably a cement roofing tile, in which a solution of one or more deliquescent salts, such as, for example, zinc chloride, is absorbed and adsorbed into the surface thereof to create a reservoir of the solution within the tile ad the like, thereby providing a water wetness ambient of permanence on the surface of the tile, so that any dirt deposited on the water wet surface will make a weak bond and thereby permit the normal rains to wash off the dirt accumulated on the tile surface, and the roof to become self washing.

METHOD OF PRODUCING A DIRT-RESISTANT TILE

CROSS-REFERENCE TO RELATED APPLICATION

This application is a division of an application entitled Means For Retarding Dirt Accumulation On Roofing Material, filed on Feb. 19, 1968, Ser. No. 706,697, now abandoned.

BACKGROUND OF THE INVENTION

1. Field of the Invention

This invention relates to a method of treating cement tiles and the like, and more particularly to a method of treating Portland cement tiles used for roofing and patio tiles to provide a dirt-resistant surface.

In semitropical climates, white Portland cement tiles have been widely used for roofing for numerous reasons, since they are not only decorative but have a good reflective thermal insulating value, thus serving to protect the asphalt roof structure beneath the tiles from the sun and heat, thereby greatly increasing its life.

These tiles also offer excellent protection against hurricane winds. They are durable and fireproof, and are economical to manufacture and to install in place.

These tiles are relatively massive. Most are flat, especially those used on roofs, and are about 1 inch thick and weigh about 7 pounds per square foot. Therefore, it would be very expensive to manufacture a solid white tile, requiring the use of white Portland cement, or gray cement plus white pigments.

To produce an economical tile, therefore, ordinary gray Portland cement and sand are used for the production of "-gray" tiles. When "white" tiles are desired, without changing the machine setup for the production of gray tiles, a sufficient amount of white Portland cement, hydrated lime and white sand in the form of a slurry is continuously troweled on the surface of the gray tiles while they are still soft and while travelling on the continuous conveyor belt. This results in a gray Portland cement tile with a veneer or coating of white Portland cement about one thirty-second inch thick on the surface of a gray tile.

The same process is used to produce tiles of different colors. It is important to note that at present about 90 percent of the roof tile production is "white" tiles. A white roof on a residential home produces an esthetic decorative effect in combination with the pastel colored exterior stucco walls of the house. This combination of colors has a large public acceptance.

White tile roofs, however, have a serious drawback—they are difficult and expensive to maintain white.

A roof covered with so-called white tiles made as above described will accumulate enough dirt from the atmosphere to gradually turn the tiles dark gray to black in about two years' time, with the result that the decorative effect and reflective insulation value of the tiles are lost.

2. Description of the Prior Art (sodium hypochorite).

Under present practice the tiles are washed by a professional maintenance man using a high-pressure water spray (about 600 pounds per square inch) in an attempt to restore their whiteness. The do-it-yourself homeowner will scrub the tiles with a solution of one of the well advertised house cleaners, such as "Spic And Span" (trisodium phosphate) and Chlorox (sodium hypochlorite). Such washing processes restore the whiteness of the roof, but the roof is not always uniformly white, due to the inefficiency of the washing process and, in the case of old roofs that have been subjected to several washings, some of the white coating has been worn away by erosion from natural causes and more of it is blasted off by the several high-pressure washing processes and scrubbing with chemicals. Such a washed roof will usually turn black, or at least a dark gray, within 1 year.

In many cases, in order to obtain or restore a white surface to the tiles, the roof is painted soon after it has been washed as above described. But even such a painted roof will turn black in about 2 or 3 years' time, irrespective of the type of paint used, with or without fungicides. The washing and painting of a roof of about 2,000 square feet will, at the present time, cost anywhere from $100.00 to $300.00 and more, depending upon the workmanship and the type of paint used.

SUMMARY OF THE INVENTION

It is an object of this invention, therefore, to provide a novel method of treating roof tiles and the like, in which at least the upper veneer is composed of Portland cement, whereby the original color of the veneer or roofing tile and the like is maintained for a much longer period of time than methods heretofore employed.

It is a further object of this invention to provide a novel method of treating a tile roof and the like, in which the tile is entirely made of while Portland cement and white sand, or has a top veneer composed of white Portland cement and white sand, whereby the whiteness of the roof will be maintained for a much longer period of time than my methods heretofore employed.

It is a still further object to treat a cement roof and the like to create a permanent film of moisture on the surface thereof to permit the easy washing away of any collected dirt thereon by normal rainfall.

The basic concept of this invention is based upon the physical facts that any dirt, organic or inorganic, deposited upon a water wet surface cannot form a strong bond with that surface, and the bond will remain weak so long as the water wet surface is not permitted to dry out. Under these conditions the deposited dirt can be easily washed away by the normal rains and the surface becomes self cleaning.

Throughout the application the expression "Portland cement" is used to denote the composition of the tiles and the veneer coating. To control the plasticity, setting time and other characteristics of the mortar or slurry, a mixture of hydrated lime and Portland cement is used.

DESCRIPTION OF PREFERRED EMBODIMENTS

To secure a permanent film of moisture on the surface of a Portland cement tile and the like, I make use of highly water-soluble deliquescent salts, that is, salts which liquify in the ambient atmosphere. These salts can be incorporated in the cement mortar used in the manufacture of the tile, either in a solid state or in water solution. In the case of a gray Portland cement tile having a veneer of white Portland cement as discussed above, the salts can be incorporated in the slurry used for forming the veneer. As used herein, the word "slurry" is limited to a mortar or wet paste of variable consistency produced by mixing, with water, Portland cement and lime mixtures, with or without aggregates. To treat the tiles on existing roofs, the deliquescent salt in a water solution can be sprayed on the surface of clean tiles or, if the tiles are dirty, after the tiles have been washed and dried, to saturate the surface thoroughly with such a solution and, by absorption and adsorption, to create a reservoir beneath the surface. Instead of spraying, any other method of application may be employed, such as brushing or sponging. It is also possible to add the deliquescent salts to most commercial water dispersed paints, either during the manufacture of such paints or as an additive to the paint as it is applied to the roof.

The process is also applicable to monolithic cementitious Bermuda and Bahama roofs and to white gravel roofs, especially when the gravel has been painted with a lime Portland cement paint forming the porous veneer in which the deliquescent salt solution is absorbed and adsorbed as discussed more fully below.

Zinc chloride is especially effective on white tiles and the like because of the white pigment zinc sulfide film formed and deposited on the tile upon exposure to the ambient air. For this reason, it is not suitable for colored Portland cement tiles.

A monomolecular film of water created on the surface of any veneer or coating material by the presence of the deliquescent salt in the coating system will never evaporate as long as some of the deliquescent salt is present in that system, because the salt will always dessicate the air in its environment. Therefore, the salt will always be in the liquid and ionic state to react most effectively chemically with the sulfurous gases in air to produce the results desired for this invention.

The deliquescent salts suitable for this invention should be relatively inexpensive and commercially available; it must have high solubility in water so that appreciable quantities of the salt can be introduced in the tile surface undergoing treatment with a minimum quantity of water and with a minimum number of applications to the tiles; the salt solution must be colorless and of such nature that it will not produce an undesirable colored sulfide when exposed to the ambient atmosphere, since sulfurous gases found in the atmosphere react quickly with the salt in the liquid phase. This is important and eliminates many deliquescent salts, such as those of iron, copper, mercury, titanium, antimony, etc., where a white tile is involved. These salts produce colored sulfides when exposed to the weather and would impair the desired whiteness of the tile.

The salt solution, when applied to the cement tile, must not produce an undesired colored compound resulting from chemical reactions. Toxicity against bacteria is desirable to retard mildewing on the surface of the tile. Unlike cellulosic materials, cement tiles need no internal protection against fungi. Efficiency in fungicidal properties can be enhanced if needed by the addition of suitable commercial fungicides. The deliquescent salt must have considerable resistance to resolubleness.

Calcium chloride and zinc chloride ($CaC1_2$ and $ZnC1_2$) are the two most economical and easily obtainable deliquescent salts. Therefore, the experiment work for this invention was concentrated on their usage. However, to determine if other hydroscopic salts would produce similar results as the deliquescent salts, $ZnSo_4$, $MgSo_4$,$Al_2(SO_4)_3$ NaC1 were included in the tests conducted on an actual white Portland cement tile roof.

These tests showed that, after 1 year's time, the tiles treated with the hydroscopic salts turned dark gray to almost black, similar to the untreated areas.

After 2 years' time, the calcium chloride treated tile turned dark gray with patches almost black.

After 4 years and 3 months, the zinc chloride treated tiles were even whiter than they were when the roof had been washed just prior to the beginning of the test.

It is not surprising that the hygroscopic salts were not effective in producing an "antisticking film" of moisture on the tiles, but it was surprising that calcium chloride, a highly deliquescent salt, should show up so poorly when compared with the phenomenal results obtained by the zinc chloride treatment.

In order to determine what chemical or physical reactions may have occurred during the contact between the reservoir of the salts in an ionic (wet) state and the chemicals in the Portland cement tile and those in the atmosphere, tests were made using lime cement slurries. The following observations were noted:

When a calcium chloride solution was added and stirred to the slurry, no change whatsoever was noted.

When a zinc chloride solution was added to and stirred in an identical slurry, immediate evolution of heat was noted, indicating a chemical reaction, and a thickening of the slurry occurred which disappeared on prolonged stirring.

To again observe visually what type of chemical reaction occurred between the zinc chloride and the cement slurry, the water soluble ingredients of the cement slurry were extracted and a clear solution of calcium chloride was added to a portion of this extraction. No visible change whatsoever was noted. When zinc chloride was added to another portion of this extracted solution, a white flocculent gelatinous precipitate was produced.

The above tests show conclusively that zinc chloride reacts vigorously with a cement mixture, and that calcium chloride does not.

Our atmosphere is contaminated with sulfurous gases such as hydrogen sulfide.

In conducting further tests, hydrogen sulfide was profusely blown into a 10 percent water solution of calcium chloride for 15 minutes. No reaction occurred under normal pH conditions. When the solution was made alkaline, traces of yellow calcium sulfide were precipitated. The reaction was negligible.

When hydrogen sulfide was introduced into a 10 percent water of zinc chloride, white zinc sulfide immediately precipitated in large amounts.

The results of the above described tests indicate strongly that the resistance of zinc chloride to solubility may be due to its ability to form the gelatinous precipitates in the porous subsurface structure of the white veneer or coating on the tile, and its ability to produce a white zinc sulfide on the surface of the tile.

Gelatinous precipitates in general adsorb and absorb large amounts of the surplus precipitant used for their formation. It is believed that is held in a "molecular gel capsule structure" and is not readily leached away by repeated washings with water.

In the case of this invention, the gelatinous precipitate is formed not on the surface of the tile but throughout the porous inner structure of the white veneer or coating. This makes the washing away of the zinc chloride by the rains less effective.

The zinc sulfide precipitated on the surface of the tile is the result of a chemical reaction between the zinc chloride in ionic state and the ambient hydrogen sulfide in a gaseous state. The resulting white solid precipitate forms a strong molecular bond with the contacting surface.

In time, the strongly bonded zinc sulfide precipitate builds up in increments to form a white film sufficiently opaque to give to the surface of a red tile or a gray tile a white appearance. A film of such thickness on any color of tile could react as a "membrane" on the surface of the tile to further retard the leaching of the zinc chloride by the rains.

The vigorous chemical activity of zinc chloride described above with respect to this invention, and the lack of such activity by the calcium chloride, indicate why zinc chloride resists leaching about three times as long as calcium chloride. However, calcium chloride is effective to a degree and its use comes within the scope of this invention, even if more frequent applications would be necessary to maintain the tiles free from dirt.

The current car load F.O.B. factory price of calcium chloride is about 3 cents per pound, and that for zinc chloride is about 12 cents per pound. It may be more economical to use a mixture of the two in any proportions desired, from 90 percent calcium chloride and 10 percent zinc chloride to 10 percent calcium chloride and 90 percent zinc chloride. The proportions should be guided by the cost of the chemical mixture versus the labor cost of the more frequent applications.

The concentration of the solution to be used is not a critical factor. A 5 to 20 percent solution is practical. It should be guided by the method used for applying it and the type and size of the spray nozzle used. It could be more economical to apply a very fine spray rapidly, allow the solution to soak in, and then apply a second application, or apply one heavy spray using a more concentrated solution. The porosity of the tile surface is also a factor. New tiles are less porous than old tiles. Instead of spraying, the solution can also be brushed or sponged on the surface of the tiles.

It is very important, however, that from 1 pound to 2 pounds of solid dry chemical be incorporated in the surface of 100 square feet of roof area. As little as one-half pound per 100 square feet is effective, but the treatment would not last as long as the 1 pound per 100 square feet treatment. Amounts greater than 2 pounds per 100 square feet might be wasteful.

The incorporation of the deliquescent salt in the tile when it is produced has the advantage that the salt reservoir is completely integrated with the cement coating. The treatment should last longer than the subsequent treatments derived by surface penetration.

It is a common but erroneous belief that fungus growth is the major cause of dirty roofs. The use of fungicides in paints has not cured the problem. Metal surfaces, like those on an automobile, do not support fungus growth, but an enormous amount of dirt can accumulate on it if it is left standing in an open yard for several months.

In any event, the use of zinc chloride or a combination of zinc chloride and calcium chloride mixtures as prescribed by this invention will also prevent fungus growth on tiles.

Zinc chloride is a well-known antibacterial chemical. It has been used to preserve railroad ties and wooden telephone poles.

It is most remarkable that although zinc chloride is highly soluble in water, by virtue of its chemical reaction with the Portland cement tile and the sulfurous gases in the atmosphere, it can become highly resistant to leaching by the rains when exposed to the weather.

What is sought is to obtain in the subsurface or veneer of the tiles a "reservoir" of the solution.

In incorporating zinc chloride in a white Portland cement slurry, used for applying a veneer to the tiles during manufacture, a typical formula for such a purpose can be:

| | |
|---|---|
| 3 bags hydrated lime | 150 lbs. |
| 1 bag white Portland cement | 94 lbs. |
| White sand | 300 lbs. |
| Zinc chloride (dissolved in the mixing water) | 5 lbs. |
| Mixing water, about | 20 gallons |

While the above discussion relates to white tile roofs and the like, the process is also applicable to roofs having colors other than white, by choosing a deliquescent salt which would produce, upon exposure to the ambient atmosphere, a sulfide matching the color of the tile to be treated. For example, antimony trichloride, which produces a red sulfide pigment upon exposure to the ambient atmosphere, could be employed on a red tile.

Based upon the above actions of the process, a new method of maintaining tile roof clean is proposed which will not require high pressure washing treatments between each application of the zinc chloride treatment.

Case 1. New roof

No dirt deposit is visible on a new roof for at least 1 year. After a year's exposure apply the zinc chloride treatment. The first treatment will keep the roof clean for several years. After a few years, while the roof is still visibly white and therefore no washing is necessary, apply the second application of the zinc chloride treatment. Continue with this procedure as needed.

Case 2. Old roof which is dirty

Clean the roof with a high-pressure washing. Apply the zinc chloride treatment after roof is dry. This will keep the roof clean for several years. Proceed as in case 1. No washing between zinc chloride treatments.

Case 3. Very old roof which, after washing, has some tiles with little or no white cement coating on their surface.

Wash the roof with high-pressure spray. Allow it to dry. Apply the zinc chloride treatment over the entire roof. Then paint the entire roof with a commercial lime-cement paint. Apply two coats on those tiles whose white coating has eroded. This treatment will last several years. Then proceed as in case 1. No washing between zinc chloride treatments.

While the above specific methods of treatment list zinc chloride as the specific deliquescent salt, the same method would be followed for other deliquescent salts.

By following the above procedure, a new roof would never be subjected to 600 pounds per square inch water blasting in its lifetime; therefore, no erosion of the white cement coating or veneer except that which might result from natural causes. Results—longer decorative life.

An old existing roof would be subjected only once to high pressure washing for the rest of its life. Results—longer life.

The economic aspect is an important feature of this invention.

Exploratory tests have indicated that the other deliquescent salts of the zinc halogen group, such as zinc iodide and zinc bromide, have similar chemical and physical properties as zinc chloride and could be used in its place in this invention. However, their usage is not practical because of their very high cost in comparison with that of zinc chloride, or their nonavailability in commercial grades or quantities.

It is obvious, therefore, that in all aspects technical grade zinc chloride is the most economical and suitable material for this invention. Its multiplicity of attributes create on the surface structure of the cement tile and the like an ambient in which fungus growth will not thrive, and any dirt, organic or inorganic, will form a weak bond, so that it can be washed away by the normal rains.

The material and application cost of a "chemical spray" job may compare in cost with a "paint" job, but the "chemical spray" job becomes very economical when one takes into account that the "chemical spray" job will last approximately twice as long as a "paint" job.

In the subjoined claims, the term "tile and the like" has reference not only to roofing tiles but also to patio tiles, white gravel roofs wherein the gravel has been painted with a lime Portland cement paint, and to monolithic cementitious Bermuda and Bahama roofs, and the like.

I claim:

1. In a method of treating tiles and the like to produce a dirt-resistant surface, in which at least the outer portion of the tiles and the like is formed of white Portland cement or Portland cement-lime mixtures with and without aggregates and exposed to the ambient atmosphere, including the step of impregnating the outer portion with a solution of zinc chloride to obtain and create on the surface and subsurface structure of the tiles and the like a reservoir of the solution, whereby, by virtue of its deliquescency, a water wet film is created on the surface of the tile and the like to prevent a strong bond of any dirt deposited thereon so that such dirt can be washed away by the rains, and whereby the zinc chloride in solution reacts with the sulfurous gases in the ambient atmosphere to form, in situ, the white pigment zinc sulfide.

2. In a method of treating tiles and the like as defined in claim 1, including the steps of washing and drying the outer portion of the tile and the like prior to the impregnation thereof.

3. In a method of treating tiles and the like as defined in claim 1, in which said solution is an aqueous solution.

4. In a method of treating tiles and the like as defined in claim 1, in which said zinc chloride is present in a 5 to 20 percent aqueous solution.

5. In a method of treating tiles and the like as defined in claim 1, in which said zinc chloride is applied at the rate of 0.5 to 2 pounds per 100 square feet of tile area.

* * * * *